United States Patent [19]
Keogh

[11] 3,772,624
[45] Nov. 13, 1973

[54] ELECTRICAL DISTRIBUTION TRANSFORMER HAVING PRESSURE RELIEF MEANS

[75] Inventor: Thomas H. Keogh, Pittsburgh, Pa.

[73] Assignee: Allis-Chalmers Corporation, Milwaukee, Wis.

[22] Filed: May 5, 1972

[21] Appl. No.: 250,837

Related U.S. Application Data

[63] Continuation of Ser. No. 97,144, Dec. 12, 1970, abandoned, which is a continuation-in-part of Ser. No. 887,162, Dec. 22, 1969, abandoned.

[52] U.S. Cl. ............... 336/55, 137/541, 174/17 VA, 220/44 R, 251/144, 336/58, 336/90
[51] Int. Cl. ............................................. H01f 27/08
[58] Field of Search ................... 336/55, 57, 58, 59, 336/60, 61, 62, 90; 220/44 R; 137/541, 587; 251/144; 174/17 VA

[56] References Cited
UNITED STATES PATENTS

| | | | |
|---|---|---|---|
| 3,131,718 | 5/1964 | Mingrone | 137/541 X |
| 2,614,582 | 10/1952 | St. Clair | 137/541 X |
| 3,381,524 | 5/1968 | Dornbush et al. | 336/90 X |
| 1,685,307 | 9/1928 | Baker | 237/54 VR |
| 1,779,421 | 10/1930 | Cox | 137/541 X |
| 1,260,663 | 3/1918 | Gould et al. | 137/541 |
| 2,784,737 | 3/1957 | Kelly | 137/541 X |
| 3,363,652 | 1/1968 | James | 251/144 X |
| 1,093,576 | 4/1914 | McNutt | 137/541 X |
| 1,982,294 | 11/1934 | Griffin | 137/541 X |
| 3,294,116 | 12/1966 | Tremeau | 137/541 |

FOREIGN PATENTS OR APPLICATIONS

| 1,179,894 | 12/1958 | France | 137/541 |

*Primary Examiner*—Thomas J. Kozma
*Attorney*—Lee H. Kaiser et al.

[57] ABSTRACT

High internal pressure within a distribution transformer casing caused by an incipient fault or thermal overload is a hazard to the lineman, and the transformer is provided with a pressure relief valve which opens automatically to limit the total pressure rise within the casing or may be actuated manually by the lineman to vent the casing even though the internal pressure is below the operating level of the relief device. A die cast plug alternatively may be used to seal the transformer casing or may be formed in a simple machining operation into the pressure relief device valve body with an integral valve seat and an integral valve stem guide.

10 Claims, 6 Drawing Figures

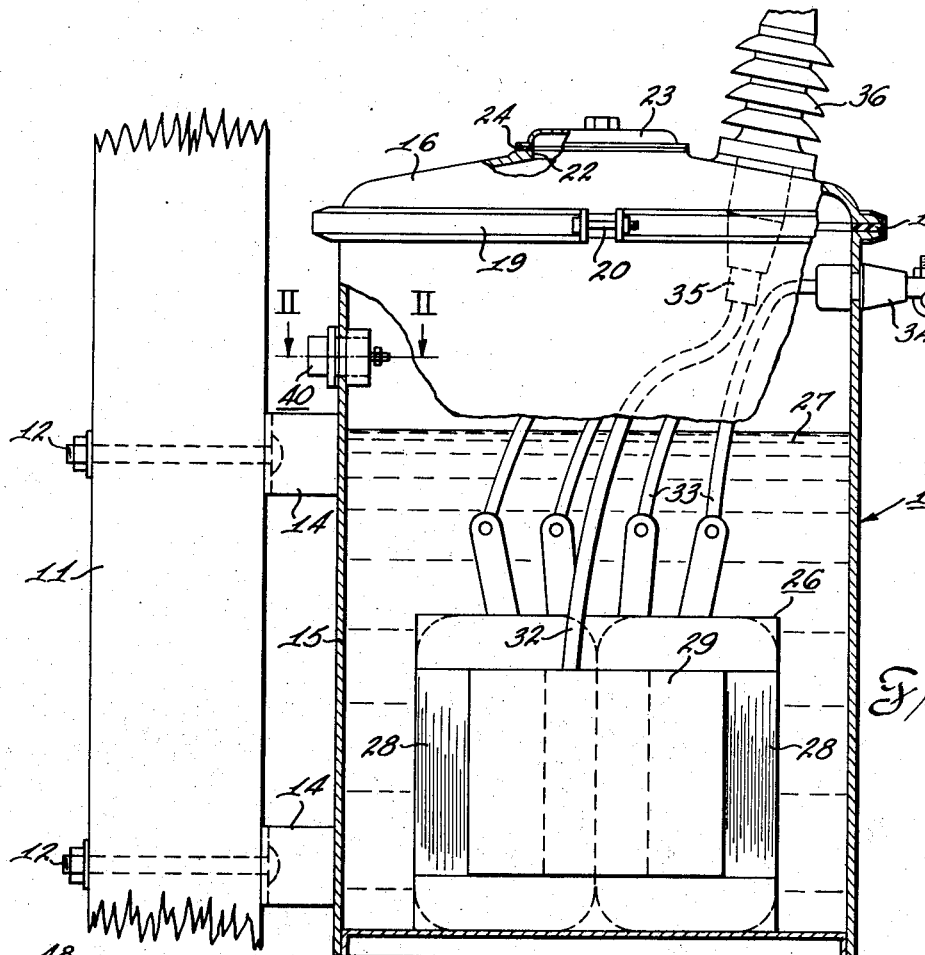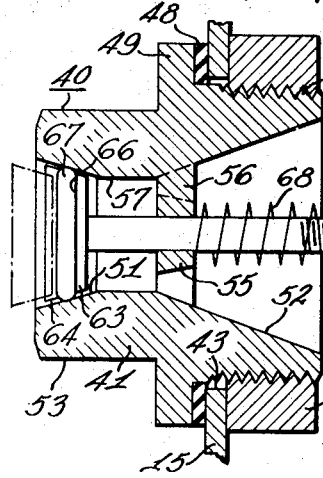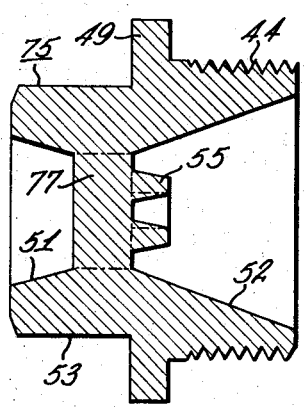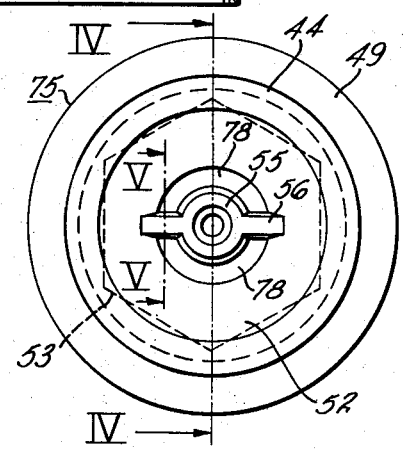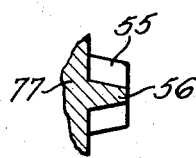

ELECTRICAL DISTRIBUTION TRANSFORMER HAVING PRESSURE RELIEF MEANS

This application is a continuation of my application Ser. No. 97,144 filed Dec. 12, 1970, now abandoned, which was a continuation-in-part of my parent application Ser. No. 887,162, filed Dec. 22, 1969, entitled Electrical Distribution Transformer Having Pressure Relief Means, now abandoned, and having the same assignee as this application.

This invention relates to electrical distribution transformers and in particular to safety devices for electrical distribution transformers.

Pressure relief devices have been used for many years on electrical power transformers. Earlier pressure relief devices were principally of the frangible disk type, and recently spring-calibrated, automatic restoring, or resealing pressure relief devices have been widely used on power transformers. Pressure relief devices have not been used on the physically smaller distribution transformers, probably because the gaskets used in earlier years to hermetically seal the distribution transformer casing quickly deteriorated and assumed a permanent set in use and thus permitted the transformer to "breathe". In recent years, nitrile rubber sealing gaskets have been used which do not rapidly deteriorate and assume a permanent set and which maintain the hermetic seal of the distribution transformer casing almost indefinitely.

Pole mounted distribution transformers with such nitrile rubber gaskets can develop excessive internal pressures because of arcing or incipient fault currents within the casing which are not of sufficiently high magnitude to rupture the primary protective link or operate the thermally responsive secondary breaker. Such excessive overpressure within the distribution transformer casing is a hazard to the lineman climbing the pole to service the transformer. Valve means of the type disclosed in U.S. Pat. No. 3,381,524 to Dornbush et al. are known which can be operated only manually by the lineman from the exterior of the distribution transformer casing to determine whether dangerous overpressures exist within the casing and to relieve such overpressure before opening the casing cover.

It is an object of the invention to provide a compact pressure relief device for distribution transformers which maintains a normal internal pressure within the casing, protects linemen and maintenance personnel, helps eliminate the hazard of fires, and prevents entrance of contaminants and moisture into the transformer casing.

It is a further object to provide such a pressure relief device for a distribution transformer which opens to vent the casing towards the pole when the pressure within the casing reaches a first predetermined magnitude and which automatically reseals the casing when the pressure falls to a lower second predetermined magnitude and which can easily be actuated manually to vent the casing even though the internal pressure is below that at which the relief device operates. Another object is to provide a distribution transformer having a pressure relief valve which operates at a predetermined pressure to limit the total pressure rise resulting from incipient faults or thermal overloads and to reduce the total pressure rise resulting from arcing under the oil and which automatically reseals to prevent the introduction of moisture and contaminants into the casing in the event the valve operates while the transformer is under load and subsequently sees negative pressure as the result of severe load reduction. A further object is to provide a novel structure for such a pressure relief valve which serves as a plug for the distribution transformer casing when pressure relief means are not required and which can be machined in a single simple operation to form a valve body having an integral valve seat and an integral spring retainer and valve stem guide.

These and other objects and advantages of the invention will be more readily apparent from the following detailed description when considered in conjunction with the accompanying drawing in which:

FIG. 1 is an elevation view, partly in section, of a pole mounted distribution transformer embodying the invention;

FIG. 2 is an enlarged view taken on line II—II of FIG. 1;

FIG. 3 is an end view of the novel plug which can be converted into the valve body of the pressure relief device;

FIG. 4 is a sectional view taken along line IV—IV of FIG. 3;

FIG. 5 is a view taken along line V—V of FIG. 3; and

Figure 6:
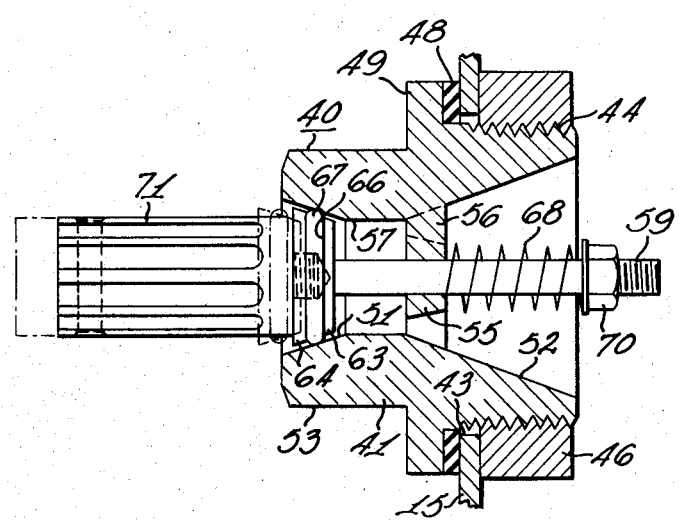
FIG. 6 is a view similar to FIG. 2 of an embodiment of pressure relief device having a handle accessible from the exterior of the transformer to permit the lineman to manually operate the valve and thus vent the interior of the casing to the atmosphere.

Referring to the drawing, an electrical distribution transformer incorporating the invention has a cylindrical metal casing, or tank 10 supported on a vertical wooden pole 11 by bolts 12 which extend through hanger brackets 14 welded to the casing sidewall 15 and protrude through pole 11. Casing 10 is closed by a metallic cover 16 with a resilient nitrile rubber gasket 17 compressed therebetween, and cover 16 is releasably attached to casing 10 by a flexible banding strap 19. The ends of banding strap 19 are connected by releasable tensioning means 20 which may be tightened to force cover 16 toward casing 10 to compress gasket 17 and which may be released to permit removal of cover 16 from casing 10 by a lineman. Cover 16 may have a hand hole 22 permitting access to the interior of casing 10 and which is normally closed by a hand hole cover 23 with a resilient nitrile rubber gasket 24 compressed therebetween to effect a hermetic seal. Hand hole cover 23 is releasably secured to cover 16 by any suitable means (not shown).

A distribution transformer core and coil assembly 26 is immersed in an insulating dielectric fluid 27 such as transformer oil contained in casing 10. Core and coil assembly 26 may include a pair of magnetic cores 28 wound from magnetic steel having back-to-back sides defining a core winding leg which is encircled by a winding assembly 29 having a primary winding, or coil (not shown) connected by suitable conductors 32 to primary insulating bushings 36 mounted on cover 16 and a secondary winding (not shown) connected by suitable conductors 33 to secondary insulating bushings 34 affixed to the sidewall 15 of casing 10.

Nitrile rubber gasket 17 assures that the transformer oil does not deteriorate in dielectric strength and sludge as a result of moisture and air entering the casing 10. However, dangerous overpressures may build up internally of casing 10 as a result of arcing beneath the oil or as a result of incipient fault current which is not of sufficiently high magnitude to rupture a primary fuse link shown schematically at 35 or to operate a thermally responsive secondary breaker (not shown). Such overpressure is a hazard to a lineman climbing the pole 11 as he attempts to open cover 16 or hand hole cover 23.

In accordance with the invention, a pressure relief valve 40 is mounted in casing sidewall 15 adjacent pole 11 and above the upper level of the oil 27 which automatically operates to open position when a first predetermined pressure, e.g., 5 psi, builds up within casing 10 to vent to the atmosphere and towards pole 11 explosive gas mixtures resulting from arcing under the oil and to limit the total pressure rise such as caused by an incipient fault current of insufficient magnitude to rupture fuse link 35, and which recloses to reseal the casing when the internal casing pressure falls to a second predetermined lower pressure, e.g., 2 psi. Pressure relief valve 40 (see FIG. 2) includes a cylindrical metallic valve body 41 extending through an aperture 43 in casing sidewall 15 and having external threads 44 at one end which engage internal threads in a metallic ring 46 welded to casing sidewall 15 internally of the casing and in surrounding relation to aperture 43. A suitable resilient gasket 48 is compressed between a circumferential flange 49 intermediate the ends of valve body 41 external of the casing and the casing sidewall 15 to normally provide a hermetic seal for the pressure relief valve at aperture 43.

Valve body 41 is preferably die cast of a suitable metal such as aluminum to have a conical axial opening defining a tapered valve seat 51 at the end exterior of the casing 10 and also have a conical axial compartment 52 at the end interior of casing 10. Valve body 41 is also preferably die cast to have a hexagonal tool engaging surface 53 at its outer end to facilitate turning of valve body 41 manually by a wrench. Further, valve body 41 is preferably die cast to have an integral spring retainer comprising an annular valve stem guide 55 coaxial with valve body 41 and disposed in a plane normal to the axis of valve body 41 adjacent the smaller diameter end of conical compartment 52 but spaced from the wall of valve body 41 defining conical compartment 52 and also being integral with a plurality of arms, or ribs 56 which extend radially from annular valve stem 55 and are integral with the wall of valve body 41 defining conical compartment 52. The axial conical openings 51 and 52 at opposite ends of valve body 41 communicate through a cylindrical axial opening 57 in valve body 41. An elongated valve stem 59 is reciprocable axially of axial opening 57 in valve body 41 and protrudes through annular valve stem guide 55.

At its outer end valve stem 59 has a circular valve head 63 with a substantial dimension in the axial direction. Valve head 63 has a circumferential tapered peripheral face 64 which is complementary to conical valve seat 51. A circumferential groove 66 is provided in tapered face 64, and a resilient gasket such as an O-ring gasket 67 of Buna-N rubber is disposed within circumferential groove 66. Valve stem 59 may be threaded at its inner end or may have a circumferential groove for a retaining ring, and a cylindrical compression spring 68 circumjacent valve stem 59 is compressed between the annular valve stem guide portion 55 and a nut 70 threaded on the inner end of valve stem 59 and urges O-ring gasket 67 on valve head 63 against conical valve seat 51 to seal pressure relief valve 40.

The pressure internal of casing 10 is exerted against valve head 63. When the first predetermined pressure exists within casing 10, valve stem 59 is lifted from the position shown in full lines in FIG. 2 to that shown in dotted lines to vent casing 10 to the atmosphere and limit the total pressure rise within the casing 10 caused by fault current. The predetermined pressure at which the pressure relief valve 40 operates to open position may be adjusted in the embodiment shown in FIG. 2 by turning nut 70 relative to valve stem 59 to change the loading on compression spring 68.

The embodiment of pressure relief valve 40 shown in FIG. 2 may be manually actuated to vent casing 10 by engaging hexagonal surface 53 with a wrench and turning valve body 41 through a fraction of a turn to release the compression on gasket 48 and thus vent casing 10 at aperture 43.

The embodiment of pressure relief valve shown in FIG. 6 has a handle 71 affixed to valve head 63 and accessible from the exterior of casing 10 and may be manually operated to vent casing 10 by pulling on handle 71 to move valve stem 59 longitudinally against the bias of spring 68 to the open position shown in dotted lines wherein O-ring gasket 67 is lifted off valve seat 51. Handle 71 may extend longitudinally of valve stem 59 and have a threaded extension which engages a tapped hole in the outer face of valve head 63.

It will thus be appreciated that pressure relief valve 40 operates automatically to open position at a first predetermined internal pressure within casing 10 and seals itself at a lower second predetermined pressure and can also be actuated manually to vent casing 10. Such manual operation permits the lineman to vent a faulted transformer before handling it even though the internal pressure within casing 10 is below the operating pressure of relief device 40.

It is often desirable to test casing 10 for leaks at a pressure higher than the operating pressure for relief device 40 by immersing it in water and looking for air bubbles. Valve body 41 is constructed in a single simple machining, or drilling operation from a die cast body member 75 shown in FIGS. 3–5, and body member 75 may be used as a plug for aperture 43 during such pressure tests on casing 10 and it also may be so used as a plug for aperture 43 on any distribution transformer which in operation does not require a pressure relief valve. Body member, or plug 75 is identical to valve body 41 except that axial opening 57 is not yet drilled therein. Body member 75 is die cast to have circumferential flange 49, external threads 44, conical valve seat 51, hexagonal surface 53, conical axial compartment 52 and a web 77 between axial openings 51 and 52 which is integral with the radial ribs 56 and the annular valve stem guide 55.

In order to convert plug 75 into valve body 41, web 77 is drilled axially from conical axial opening 51 toward conical compartment 52 to the depth of radial ribs 56 and annular valve stem guide 55 (as shown by dot-dash lines in FIG. 4). Such drilling operation forms axial opening 57 and brings axial conical opening 51 into communication with axial conical compartment 52 through the arcuate apertures 78, seen in FIG. 3, between annular valve stem guide 55 and radial ribs 56 and the body wall defining axial conical compartment 52.

It will be appreciated that, if desired, valve body 41 can be die cast to have axial opening 57 so that no machining of the web is required.

It should be understood that I do not intend to be limited to the particular embodiments shown and described for many modifications and variations thereof will be readily apparent to those skilled in the art.

The embodiments of the invention in which an exclusive property or privilege is claimed are defined as follows:

1. In combination, an electrical distribution transformer having a casting, a cooling dielectric fluid within said casing, a transformer core and coil assembly immersed in said fluid within said casing, a pressure relief valve extending through a wall of said casing and communicating with the interior of said casing above said dielectric fluid and normally being closed and being operable to open position in response to a first predetermined magnitude of internal pressure within said casing to vent the interior of said casing and release sufficient gas to the atmosphere to limit total pressure rise within the casing in the event of a transformer fault and to reclose and reseal said casing when said internal pressure drops to a second predetermined magnitude which is below said first predetermined magnitude, and handle means accessible from the exterior of said casing for manually operating said valve to vent the interior of said casing to the atmosphere.

2. In the combination of claim 1 wherein said transformer has hanger bracket means affixed to a sidewall of said casing for mounting said transformer on a pole and said pressure relief valve extends through said sidewall in the vicinity of said hanger bracket means and a handle is associated with said pressure relief valve for manually opening said valve to open position to vent the interior of said casing to the atmosphere and said handle is mounted to be accessible from the exterior of said casing to a lineman on said pole.

3. In the combination of claim 2 wherein said pressure relief valve includes an elongated cylindrical valve body extending through an aperture in said casing wall and having an axial opening therethrough of sufficiently large cross section to limit total pressure rise within said casing in the event of a transformer fault and an annular surface defining a valve seat, an elongated valve stem reciprocable longitudinally within said axial opening and having a radial extending valve head, and spring means for biasing said valve stem in a longitudinal direction to normally urge said valve head against said valve seat, and wherein said handle is affixed to said valve stem and permits manual actuation of said valve stem in a longitudinal direction to lift said valve head off said valve seat.

4. In the combination of claim 3 wherein said valve body has a spring retainer extending radially across said axial opening and being integral and of one piece with said valve body and having a guide aperture axial of said valve body slidably receiving said valve stem, and wherein said spring means is a cylindrical spring surrounding said valve stem and abutting at one end against said spring retainer.

5. In the combination of claim 4 wherein said spring retainer includes an annular portion of smaller diameter than said axial opening and a plurality of arcuately spaced apart radial arms each of which is integral and of one piece at one end with said annular portion and is integral and of one piece at the other end with said valve body, and the opening in said annular portion forms said guide aperture for said valve stem.

6. In the combination of claim 5 wherein said valve body has a conical surface defining said valve seat and partially defining said axial opening, said valve head has a conical circumferential surface complementary to said valve seat and a circumferential groove in said circumferential surface, and said pressure relief valve also includes a resilient annular gasket disposed within said circumferential groove and compressed against said valve seat by said spring means when said valve is closed.

7. In the combination of claim 6 wherein said valve head is on the outer end of said valve stem, said valve stem has radially extending spring compressing means adjacent its inner end, and said cylindrical spring is a compression spring abutting at its opposite ends against said annular portion of said spring retainer and said radial extending means on said inner end of said valve stem respectively.

8. In the combination of claim 4 wherein said valve body is die cast and has a conical compartment at its inner end partially defining said axial opening and said spring retainer portion is within said axial opening at the narrower end of said conical compartment and comprises a plurality of arcuately spaced radial extending arms integral with said valve body terminating at the radially inner end in an annular portion which defines said guide aperture for said valve stem, and said pressure relief valve also includes a cylindrical compression spring surrounding said valve stem and seated at one end against said spring retainer portion.

9. In the combination of claim 1 wherein said transformer has hanger bracket means affixed to a sidewall of said casing for mounting said transformer on a pole and said pressure relief valve includes a valve body protruding through an aperture in said casing sidewall in the vicinity of said hanger bracket means and having an opening therethrough of sufficiently large cross section to limit total pressure rise within the casing in the event of a transformer fault, a movable valve member reciprocable within said opening between an open position wherein the interior of said casing is vented to the atmosphere and a closed position wherein said movable valve member seals said opening, resilient means for urging said movable valve member to said closed position, said handle means being affixed to said movable valve member and being accessible from the exterior of said casing to a lineman on said pole for manually actuating said movable valve member to said open position to vent the interior of said casing.

10. In the combination of claim 1 wherein said pressure relief valve includes a valve body protruding through an aperture in said casing wall and having an opening therethrough of sufficiently large cross section to limit total pressure rise within said casing in the event of a transformer fault, a movable valve member reciprocable within said opening between an open position wherein the interior of said casing is vented to the atmosphere and a closed position wherein said movable valve member seals said opening, resilient means for urging said movable valve member to said closed position, said handle means being affixed to said movable valve member and being accessible from the exterior of said casing for manually actuating said movable valve member to said open position to vent the interior of said casing.

* * * * *

PO-1050
(5/69)

UNITED STATES PATENT OFFICE
CERTIFICATE OF CORRECTION

Patent No. 3,772,624          Dated November 13, 1973

Inventor(s) Thomas H. Keogh

It is certified that error appears in the above-identified patent and that said Letters Patent are hereby corrected as shown below:

Column 5, line 12, "casting" should read --- casing ---.

Signed and sealed this 11th day of June 1974.

(SEAL)
Attest:

EDWARD M. FLETCHER, JR.
Attesting Officer

C. MARSHALL DANN
Commissioner of Patents